(12) United States Patent
Toliver et al.

(10) Patent No.: US 6,840,285 B2
(45) Date of Patent: Jan. 11, 2005

(54) CORRUGATION STRUCTURE FOR PIPE

(75) Inventors: Timothy R. Toliver, Findlay, OH (US); Bill Russell Vanhoose, Findlay, OH (US)

(73) Assignee: Hancor, Inc., Findlay, OH (US)

( * ) Notice: Subject to any disclaimer, the term of this patent is extended or adjusted under 35 U.S.C. 154(b) by 0 days.

(21) Appl. No.: 10/468,089

(22) PCT Filed: Apr. 4, 2002

(86) PCT No.: PCT/US02/10619

§ 371 (c)(1),
(2), (4) Date: Feb. 23, 2004

(87) PCT Pub. No.: WO02/081957

PCT Pub. Date: Oct. 17, 2002

(65) Prior Publication Data

US 2004/0129328 A1 Jul. 8, 2004

Related U.S. Application Data

(60) Provisional application No. 60/281,441, filed on Apr. 4, 2001.

(51) Int. Cl.$^7$ .................................................. F16L 11/11
(52) U.S. Cl. ........................ 138/121; 138/122; 138/173; 138/177
(58) Field of Search ................................ 138/121, 122, 138/173, 177

(56) References Cited

U.S. PATENT DOCUMENTS

| | | | | | |
|---|---|---|---|---|---|
| 3,926,222 | A | * | 12/1975 | Shroy et al. ................. | 138/122 |
| 3,929,359 | A | * | 12/1975 | Schmunk et al. ........... | 285/401 |
| 4,082,327 | A | * | 4/1978 | Sting et al. .................. | 285/401 |
| 4,202,568 | A | * | 5/1980 | Strom ......................... | 285/336 |
| 4,487,232 | A | * | 12/1984 | Kanao ......................... | 138/122 |
| 4,779,651 | A | * | 10/1988 | Hegler et al. ................ | 138/109 |
| 4,915,425 | A | * | 4/1990 | Hegler et al. ................ | 285/179 |
| 4,969,670 | A | * | 11/1990 | Bonnema et al. ........... | 285/319 |
| 5,053,097 | A | * | 10/1991 | Johansson et al. .......... | 156/158 |
| 5,071,173 | A | * | 12/1991 | Hegler et al. ................ | 285/399 |
| 5,148,837 | A | * | 9/1992 | .ANG.gren et al. ......... | 138/121 |
| 5,390,704 | A | * | 2/1995 | Kanao ......................... | 138/121 |
| 5,727,599 | A | * | 3/1998 | Fisher et al. ................. | 138/156 |
| 5,803,132 | A | * | 9/1998 | Lupke ......................... | 138/141 |
| 5,975,143 | A | * | 11/1999 | Jarvenkyla et al. ......... | 138/121 |
| 6,186,182 | B1 | * | 2/2001 | Yoon ........................... | 138/122 |
| 6,343,623 | B2 | * | 2/2002 | Hegler ......................... | 138/109 |
| 6,399,002 | B1 | * | 6/2002 | Lupke et al. ................ | 264/139 |
| 6,607,010 | B1 | * | 8/2003 | Kashy .......................... | 138/121 |
| 6,644,357 | B2 | | 11/2003 | Goddard ...................... | 138/121 |

OTHER PUBLICATIONS

International Search Report dated Jun. 12, 2002 (3 pgs.).

* cited by examiner

*Primary Examiner*—Patrick Brinson
(74) *Attorney, Agent, or Firm*—Jones Day (57) ABSTRACT

A corrugated pipe (2) has a plurality of corrugation structures (10, 12) positioned adjacent one another. The corrugation structures (10, 12) comprise an inner cylindrical wall (22), two annular wall portions (28, 32) that extend outwardly from the inner cylindrical wall (22), and a bowed annular wall portion (40) that is connected to the outer ends (36, 38) of the two annular wall portions (28, 32). The corrugation structure (10, 12) includes a centroid (48, 49) and at least a portion of the inner surface (50) of the bowed wall portion (40) has a radius $R_1$ centered on the centroid (48, 49) and at least a portion of the outer surface (52) of the bowed wall portion (40) has a radius and at least $R_2$ centered on the centroid (48, 49). The cavity (56) defined by the corrugation structure (10, 12) has an inner surface with an inner radius $R_2$ centered on the centroid (48, 49). The cavity (56) defined by the corrugation structure (10, 12) has a inner surface with an inner radius $R_1$, $R_3$ that is equal to or greater than one half the thickness $T_1$ of the inner cylindrical wall (22). The profile of the corrugation structure (10, 12) is configured to optimally accept forces caused by backfill soil positioned over the pipe (2). A method of manufacturing a corrugated pipe (2) includes manufacturing a first, a second, and a third corrugated pipe (80, 90, 100) with each pipe having an inner diameter ID and an outer diameter OD. The inner diameter ID is chosen such taht the first pipe (80) can be telescopically inserted into the second pipe (90) and the second pipe (90) can be telescopically inserted into the third pipe (100). A method of shipping a plurality of different diameter pipes is also provided.

9 Claims, 4 Drawing Sheets

CORRUGATION STRUCTURE FOR PIPE

This application is a 371 of PCT/4502/10619 filed Apr. 4, 2002 which claims benefit of provisional application 60/281,441 filed Apr. 4, 2001.

FIELD OF THE INVENTION

The claimed invention relates to a corrugated pipe. In particular, the invention relates to a corrugation structure for a corrugated pipe.

BACKGROUND OF THE INVENTION

Corrugated pipes are oftentimes made of a synthetic material that is generally intended for underground use where a high pressure must be withstood. Such pipes are typically used for water main pipes, sewer pipes, drain pipes, electric and telephone cable conduits, and the like. In installing pipes underground, the pipes are positioned in trenches and then covered with a backfill soil

SUMMARY

According to the invention, a corrugated pipe having a longitudinal axis comprises a plurality of corrugation structures positioned adjacent one another to form a portion of the corrugated pipe. Each corrugation structure includes a cylindrical wall centered on the longitudinal axis and an annular U-shaped wall extending from the cylindrical wall. The U-shaped wall has a thickness that is uniform or substantially uniform throughout the length thereof.

The invention also concerns a corrugation structure for a corrugated pipe having a longitudinal axis. The corrugation structure comprises an inner cylindrical wall centered on the longitudinal axis, two annular wall portions that extend outwardly from the cylindrical wall, and an annular bowed wall portion. Each of the outwardly extending wall portions have a radially outer end. The annular bowed wall portion extends axially between the radially outer ends of the two annular wall portions, The bowed wall portion has an inner surface and an outer surface, with the two annular wall portions and the annular bowed wall portion together defining an outer wall that is connected to the inner cylindrical wall. The corrugation structure also includes a centroid defined by the corrugation structure. At least a portion of the inner surface of the bowed wall portion has a radius centered on the centroid, and at least a portion of the outer surface of the bowed wall portion has a radius centered on the centroid.

The invention also relates to a corrugation structure for a corrugated pipe having a longitudinal axis. The corrugation structure is symmetric about a plane that is perpendicular to the longitudinal axis of the corrugated pipe and comprises an inner cylindrical wall, two annular wall portions, and a bowed wall portion. The inner cylindrical wall is centered on the longitudinal axis of the corrugated pipe and has a wall thickness at the plane of symmetry. The two annular wall portions extend outwardly from the cylindrical wall and are spaced from one another, with each outwardly-extending wall having a radially outer end. The bowed annular wall portion extends axially between the radially outer ends of the two annular wall portions. A cavity is bounded by the inner cylindrical wall, the outwardly extending wall portions and the bowed wall portion. The cavity has an inner surface, and the inner surface has at least one inner radius, with the inner radius being equal to or greater than one half the thickness of the inner cylindrical wall at the plane of symmetry.

The invention also concerns a corrugation structure for a corrugated pipe having a longitudinal axis. The annular wall portions have an outer surface, with each outer surface having an outer surface end point at the radially outer end thereof. The curved wall portion also has an outer surface. A peak point is located on the outer surface of the curved wall portion at the radially outermost point thereof relative to the longitudinal axis. An angle formed between a line extending from the peak point to the outer surface end point of the annular wall portions relative to the longitudinal axis is a function of a natural slip angle.

The invention further relates to a corrugated pipe having a longitudinal axis that comprises first and second corrugation structures positioned adjacent a plurality of corrugation structures to form a portion of the corrugated pipe. The first and second corrugation structures are positioned adjacent one another and centered on the longitudinal axis of the corrugation structure. Each of the first and second corrugation structures are symmetrical about a plane that is perpendicular to the axis. In addition, each of the first and second corrugation structures comprises a cylindrical wall centered on the axis. Two annular wall portions extend outwardly from the cylindrical wall at spaced locations relative to one another. The annular wall portions have outer ends and outer surfaces, and an annular curved wall portion extends axially between the outer ends of the annular wall portions. The annular curved wall portion has an outer surface. The corrugation structure also includes first and second centroids of the first and second corrugations, and a centroid line extends between the first and second centroids. The corrugation structure further includes first and second points of intersection of the centroid line with the outer surfaces of the annular wall portions of the first and second corrugation structures. A first line extends from the first point of intersection toward the second corrugation structure and is tangent to the outer surface of the annular curved wall portion of the second corrugation structure. The first line is at a first angle relative to the longitudinal axis that is equal to or greater than a predetermined natural slip angle. A second line extends from the second point of intersection towards the first corrugation structure and is tangent to the outer surface of the annular curved wall portion of the first corrugation structure. The second line is at a second angle relative to the longitudinal axis that is equal to or greater than the predetermined natural slip angle.

The invention also relates to a method of manufacturing a corrugated pipe which includes manufacturing a first, a second and a third corrugated pipe, each pipe having an inner diameter and an outer diameter. The inner and outer diameters of the pipes are chosen such that the first pipe can be telescopically inserted into the second pipe and the second pipe can be telescopically inserted into the third pipe.

The invention further concerns a method of shipping a plurality of different diameter pipes comprising providing a plurality of pipes each having a different inner and outer diameter from the other pipes. The plurality of pipes includes at least a smaller diameter pipe, an intermediate diameter pipe and a larger diameter pipe. The smaller diameter pipe has an outer diameter that is smaller than the inner diameter of the intermediate diameter pipe, and the intermediate diameter pipe has a smaller outer diameter than the inner diameter of the larger diameter pipe. The method also includes telescopically inserting the intermediate diameter pipe inside the larger diameter pipe to form bundled pipes, and telescopically inserting the smaller diameter pipe inside the intermediate diameter pipe to form bundled pipes. The method further includes the step of shipping the bundled pipes to a destination.

DETAILED DESCRIPTION

The present invention utilizes a corrugation profile on a corrugated pipe 2 that is designed to maximize the structural integrity in an installed environment and minimize the material requirements utilized to manufacture the pipe. The natural slip angle of common backfill soils is considered in conjunction with the profile dimensions of the corrugation structure of the corrugated pipe to enhance the structural performance of the profile structure, as will be discussed in conjunction with FIGS. 1–3 below.

Figure 1:
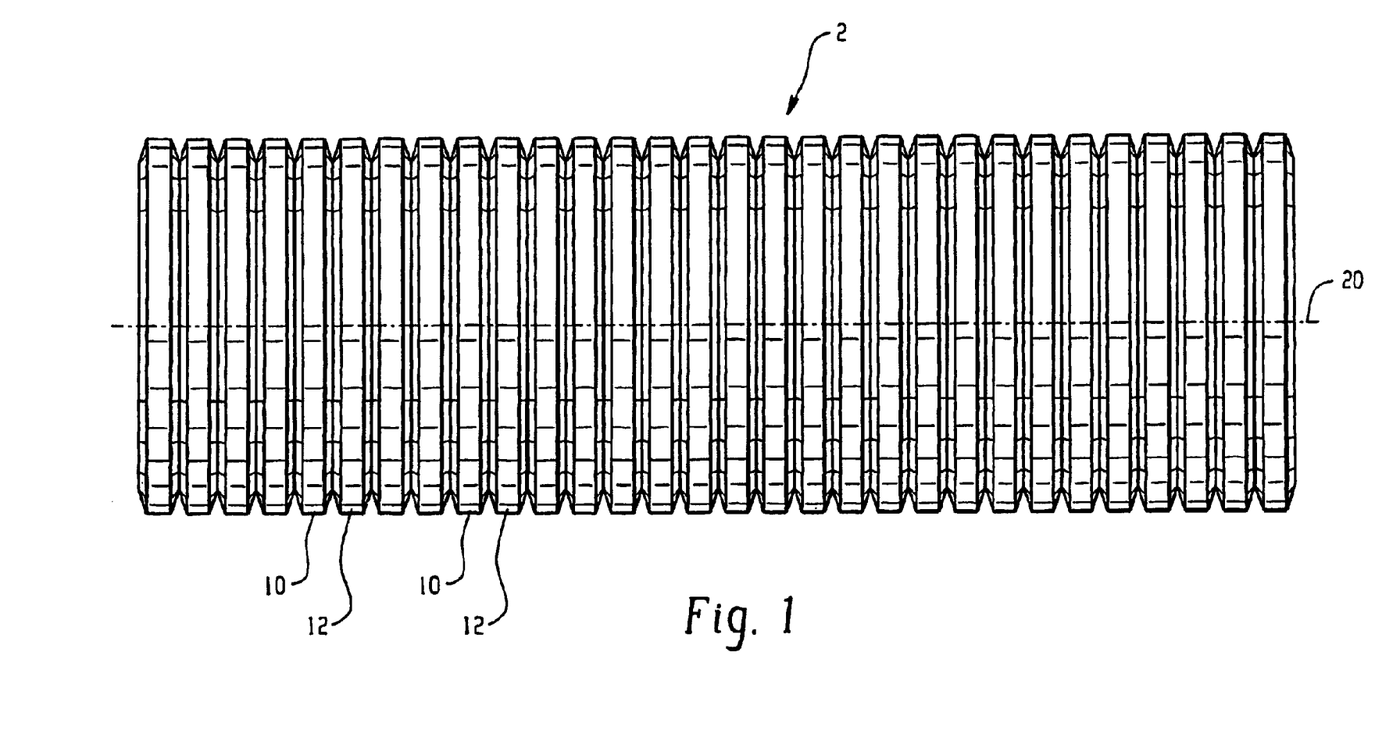
FIG. 1 is a side view of a corrugated pipe according to the invention.
Figure 2:
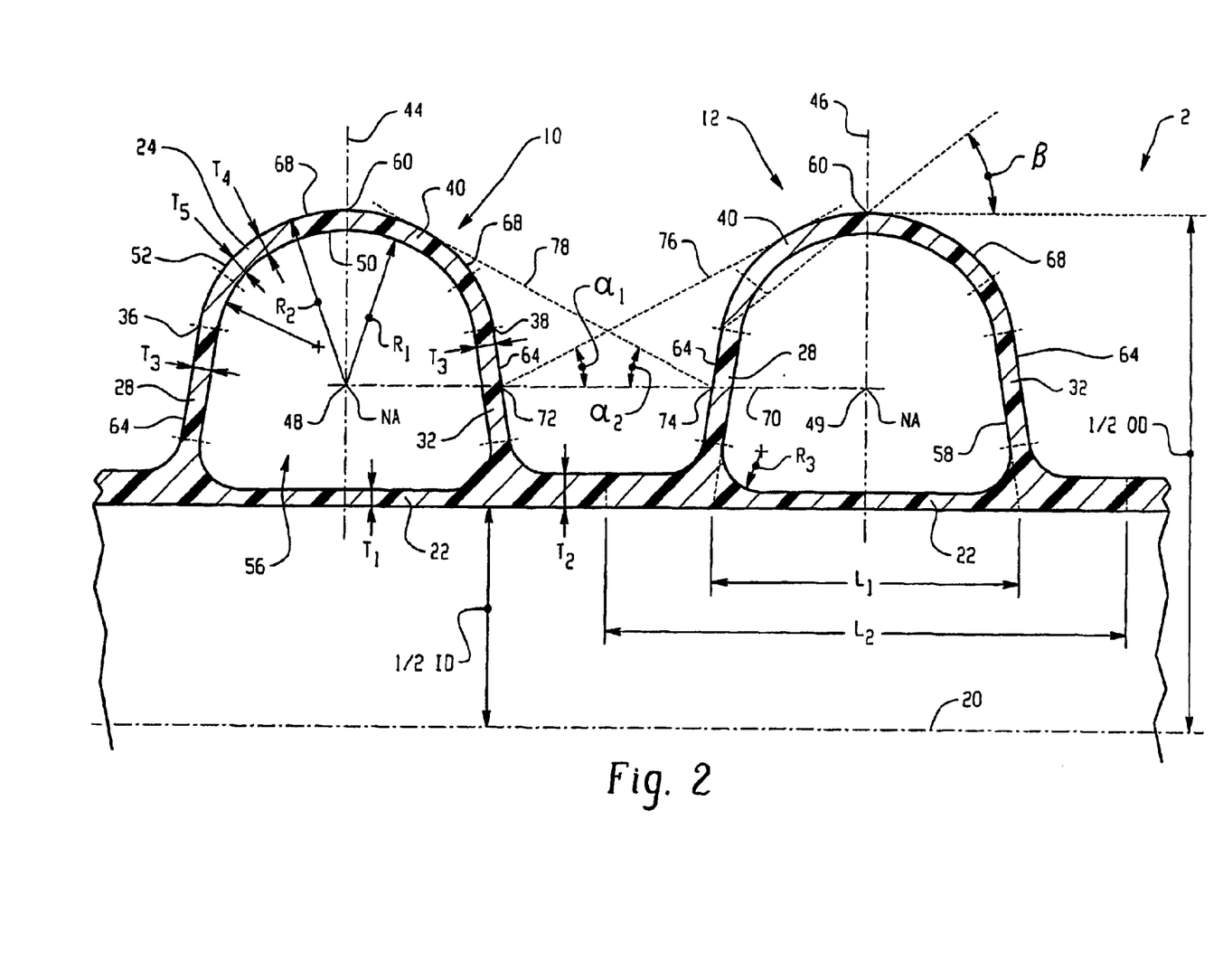
FIGS. 2 and 3 are a partial cross-sectional view of the corrugated pipe of FIG. 1, showing two corrugation structures positioned adjacent one another in the wall of the pipe.

The invention relates to a corrugation structure located among a series of corrugation structures 10, 12 positioned adjacent one another to form a corrugated pipe 2. As shown in FIGS. 1 and 2, the corrugated pipe has a longitudinal axis 20 around which the corrugation structures 10, 12 are positioned. The corrugation structures 10, 12 are cylindrical and are centered on the longitudinal axis 20 of the pipe 2. Each corrugation structure 10, 12 comprises a profile that includes an inner cylindrical wall or liner 22 and an outer annular U-shaped wall 24 extending outwardly from the inner cylindrical wall 22. The U-shaped wall 24 has a thickness $T_5$ that is preferably uniform or substantially uniform throughout the length of the wall 24. The outer wall 24 and inner wall 22 together define a cavity 56 in the interior of the corrugation structure.

Each U-shaped wall 24 of the corrugation structure 10, 12 includes two annular straight wall portions 28, 32 and a bowed or curved wall portion 40. The straight wall portions 28, 32 are spaced from each other and are positioned on opposite sides of the U-shaped wall 24. The bowed wall portion 40 extends axially between the outer ends of the straight walls 28, 34 such that the straight walls 28, 32 and the bowed wall 40 together form the U-shaped wall 24. Each straight wall portion 28, 32 extends outwardly from the inner cylindrical wall 22 in a generally radial or transverse manner while the bowed wall is oriented in a generally parallel manner to the longitudinal axis 20 of the pipe 2. The straight walls 28, 32 have a common thickness $T_3$ that is preferably uniform throughout the length of the straight walls 28, 32. The bowed wall 40 has a thickness $T_4$ that is preferably uniform throughout the length of the bowed wall 40, and that is substantially equal to the thickness $T_3$ of the straight walls 28, 32. Uniform material distribution throughout the interior of the corrugation structure will provide a uniform cross sectional area. Elimination of material thickness and dimensional thickness variations will improve the corrugation profile stability.

The corrugation structure 10, 12, as shown in FIG. 2, includes an outer diameter OD and an inner diameter ID, both of which are measured from the longitudinal axis 20 of the pipe 2. The corrugation structure profile has a crown or peak point 60 that is positioned at the radially outermost point of the bowed wall portion 40. A height of the corrugation structure profile is measured between the inner most surface of the inner cylindrical wall 22 and the peak point 60 of the corrugation structure 10, 12. The neutral axis NA of the corrugation structure 10, 12 profile is positioned at the centroid 48, 49 of the corrugation structure. The pitch or frequency of the corrugation structures 10, 12 is the length $L_2$ of each individual structure.

The corrugation structure profile is symmetric about a plane 44, 46 that is perpendicular to the longitudinal axis 20 of the pipe 2. A portion of the inner surface 50 of the bowed wall 40 has a radius $R_1$ centered on the centroid 48, 49 (neutral axis NA). Likewise, a portion of the outer surface 52 of the bowed wall 40 has a radius $R_2$ centered on the centroid 48, 49 (neutral axis NA).

The inner cylindrical wall 22 has a thickness $T_1$ at the plane of symmetry 44, 46 and a length $L_1$. The cavity 56 of the corrugation structure 10, 12 has an inner surface 58 with several inner surface radiuses, such as $R_1$ and $R_3$. In order to insure proper dispersion of local stresses so that stress risers are reduced at the transition points between the various wall portions, all of the inner surface radiuses are preferably equal to or greater than one half the thickness $T_1$ of the inner cylindrical wall 22.

The thickness of each corrugation structure profile component is based on an interdependent relationship with four performance criteria, including: 1) maximum burial depth; 2) resistance to hydraulic compression; 3) a 30% yield test criteria; and 4) AASHTO M294 mandated QC check testing requirements. All dimensions of the corrugation profile are related to these performance criteria by the moment of inertia, cross-sectional area, and location of the neutral axis. Other performance criteria are discussed in further detail below.

In use, the corrugated pipe 2 may be positioned in a trench and covered with any of a variety of backfill soils. Each backfill soil has a natural slip angle. Slip angle is directly related to the loads, and thus the actual moments and stresses, that are applied to a pipe structure during use. In particular, slip angle is directly related to the angle at which loads are applied to the corrugation structure's surface. A "maximum slip angle" is the greatest slip angle among the variety of backfill soils that the corrugation structures are expected to be covered with. Similarly, a "minimum slip angle" is the lowest slip angle among the variety of backfill soils that the corrugation structures are expected to be covered with. Natural soil slip angle will generally range from a minimum of about 28° to a maximum of about 37.5° for soil types that are more generally encountered. However, the natural soil slip angle may vary from these angles depending upon the type of fill material utilized to cover the pipe 2.

Figure 3:
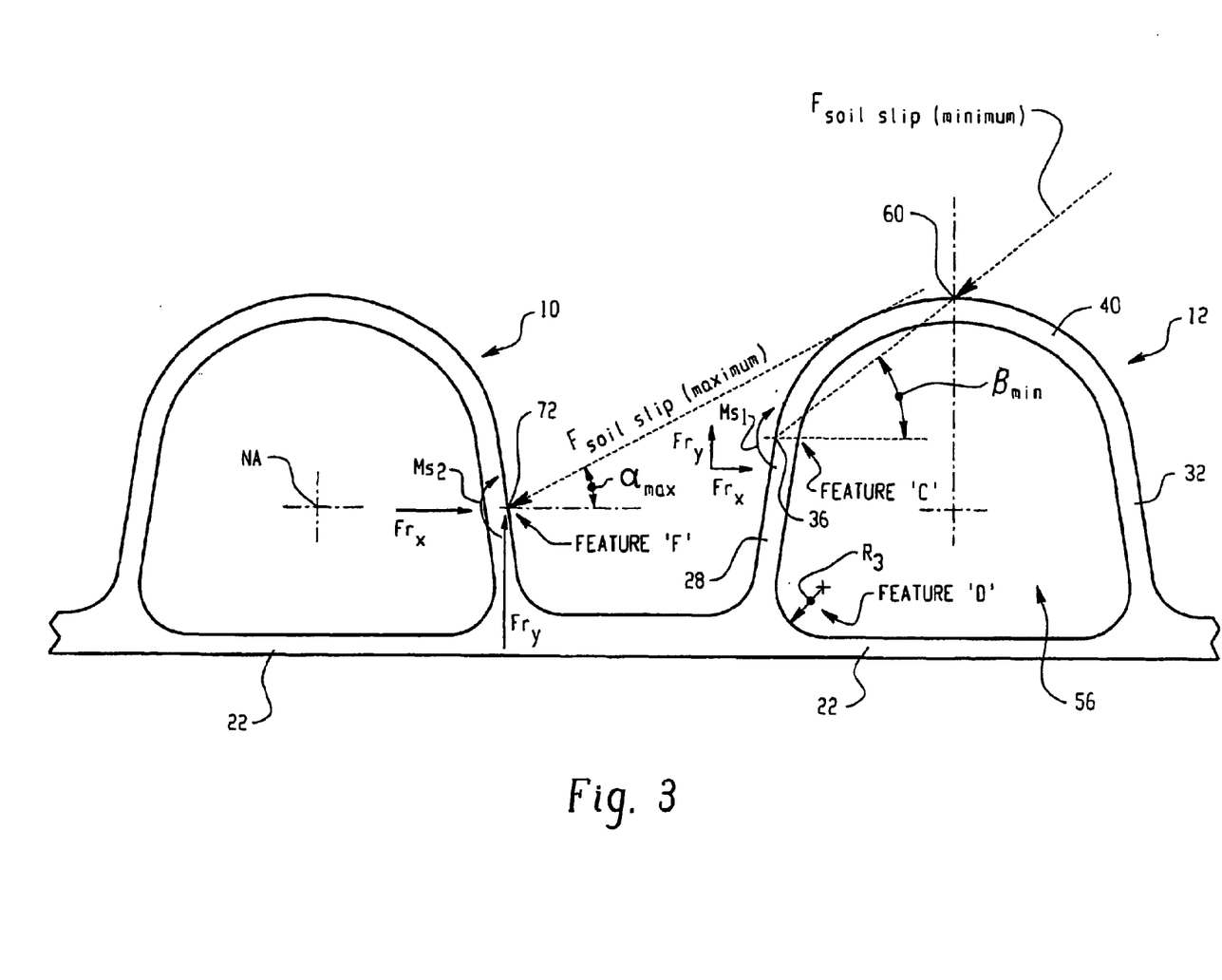

According to one aspect of the invention, the corrugation structure profile is designed such that the shape of the bowed wall 40 is a function of the natural slip angle of the backfill soil. The profile geometry, as shown in FIG. 3 (Feature C), is designed so that the bowed wall portion 40 of the corrugation structure 10, 12 profile when loaded at the peak point 60 by a force vector $F_{soil\ slip}$ at the minimum slip angle of soil β forms a maximum resisting moment $Ms_1$ on the straight side wall 28, 30 at outer surface end point 36, 38. In particular, referring to FIG. 2, the profile shape is configured so that the peak point 60 is aligned with an outer surface point 36, 38 at each of the radially outer ends of the straight side walls 28, 32 at an angle β. The angle β is a function of the natural slip angle of backfill soil. Preferably, the angle β is approximately equal to the minimum slip angle of the soil utilized with the particular corrugated pipe 2, in order to maximize the stability of the corrugation under load.

According to another aspect of the invention, the position and shape of each corrugation profile relative to the adjacent profile is also a function of the natural soil slip angle. The frequency of the corrugations (or pitch as defined FIG. 2) is specifically located such that a maximum slip angle will have a vector force $F_{soil\ slip}$ (as illustrated in FIG. 3; Feature F) at or above the neutral axis of the corrugation profile. This vector force is based upon an interface with the tangent of the bowed wall portion 40, where friction is at a minimum, with the origin point 72, 74. Locating the force $F_{soil\ slip}$ at this location will result in a stable profile. In addition, the stability of the corrugation profile is enhanced by an optimized angle between the side walls of the profile and a vertical axis. When force is vertically applied to the corrugation structure at the peak point, the side wall portions 28, 32 are oriented such that they can withstand the vertical force so that the corrugation structure does not collapse.

In particular, with reference again to FIG. 2, first 10 and second 12 corrugation structures are shown positioned adjacent one another and centered around the longitudinal axis of the corrugated pipe 2. Each of the straight side walls 28, 32 of the U-shaped wall 20 has an outer peripheral surface 64 and bowed wall 40 has an outer peripheral surface 68. As discussed above, the corrugation profiles have a centroid 48, 49, which defines the location of the neutral axis NA of the corrugation profile. A centroid line 70 is shown to extend between the centroids 48, 49. The centroid line 70 intersects the radially-extending peripheral surfaces 64 of the first and second corrugation structures at first and second points of intersection 72 and 74.

The corrugation structure profiles are configured such that a first straight line 76 extends from the first point of intersection 72 on the first corrugation structure 10 and is tangent to the bowed peripheral surface 68 of the second corrugation structure 12. The first line 76 has a first angle $\alpha_1$, relative to the longitudinal axis 20 of the pipe, that is equal to or greater than a predetermined natural slip angle of backfill soil. Likewise, a second straight line 78 extends from the second point of intersection 74 on the second corrugation structure 12 and is tangent to the bowed peripheral surface 68 of the first corrugation structure 10. The second line 78 has a second angle $\alpha_2$, relative to the central axis 20, that is equal to or greater than the predetermined natural slip angle. Specifically, the angles $\alpha_1$ and $\alpha_2$ are equal to or greater than the maximum slip angle for the corrugated pipe and are preferably equal to one another. By utilizing appropriate spacing of the corrugations (or pitch), as prescribed by lines 76 and 78, the maximum potential for slip results in a minimum lateral soil load at or above the neutral axis of the sidewall of the corrugated profile.

According to another aspect of the invention, stress concentration may also be minimized on the corrugations by controlling the wall radius inside the corrugation profile, as shown in FIG. 3 (Feature D). Feature D illustrates the area of the corrugation structure 10, 12 that is oftentimes most prone to problems associated with stress concentration. The radius $R_3$ on the interior of the corrugation cavity 56 is unique to the inventive profile. This radius is preferably equal to or greater than one half the thickness $T_1$ of the inner cylindrical wall 22.

The above-described corrugation profile design utilizes the natural soil slip angle in conjunction with the geometric design to enhance the performance of the corrugation profile. In addition, the corrugation profile design allows for minimized material thicknesses, while creating a structurally stable profile under hydraulic and compressive soil loads. The design reduces surface defects that ensures watertight gasket sealing, and the provision of a smooth radius on the interior of the profile assists in eliminating stress risers. In one embodiment, liner thickness and widths are specifically designed to withstand hydraulic loading at 10.8 psi.

According to another aspect of the invention, the corrugation structure is configured in order to allow for maximum shipping potential. In particular, shipping costs associated with the shipping of corrugated pipes is very high, primarily because a lot of dead space is found inside the pipes that is not currently utilized and the pipes themselves takes up a lot of space. One aspect of the present invention utilizes this dead space in the interior of the pipes to ship smaller diameter pipes. For instance, as many as 14 or more different diameter pipes may be shipped at one time in a single bundle by utilizing the present invention. Typical diameters of pipes that are utilized in the industry include 4", 6", 8", 10", 12", 15", 18", 24", 30", 36", 42", 48", 54", and 60" pipes, among others. According to the invention, the outside diameter of each size of pipe is designed such that it will fit into each larger size pipe. This is done by designing the size of the corrugation to provide a degree of clearance so that the smaller size pipe may easily be inserted into and removed from the larger diameter pipe. Therefore, the profile design in combination with the dimensions of the various diameter pipes minimizes shipping costs since multiple diameter pipes may be shipped in a single bundle.

Figure 4:
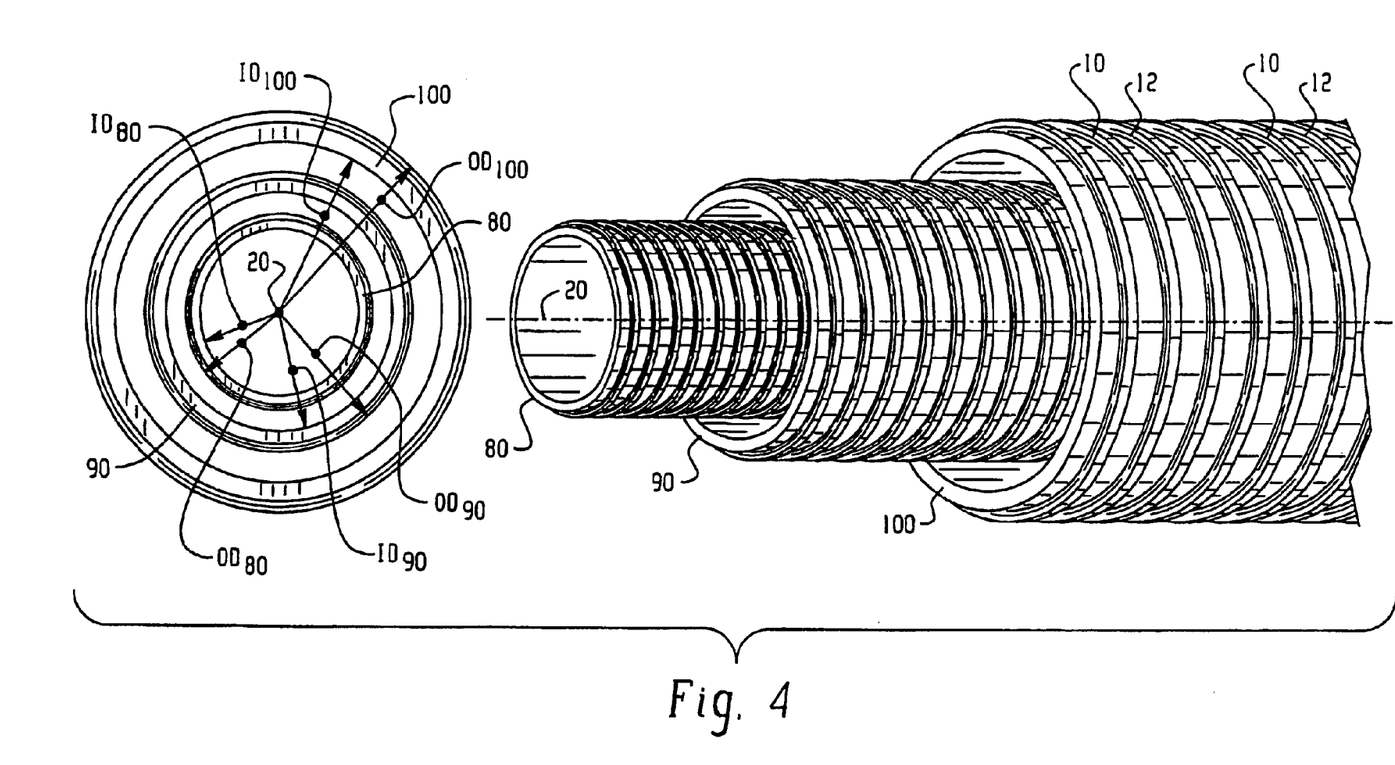
FIG. 4 is an end and a side perspective view of another aspect of the invention, showing multiple diameter pipes inserted inside one another for shipping purposes.

An example of this is shown in FIG. 4, where first 80, second 90 and third 100 diameter corrugated pipes 2 are depicted. Each pipe 2 has an inner diameter ID and an outer diameter OD that is different from the other. The inner diameter ID and outer diameter OD of each pipe are chosen such that the first pipe 80 can be telescopically inserted into the second pipe 90, and the second pipe 90 can be telescopically inserted into the third pipe 100. This allows for the smallest diameter pipe 80 to be inserted inside the middle diameter pipe 90. And the middle diameter pipe 90 may be inserted inside the largest diameter pipe 100, which results in reducing cost and size in shipping of the pipes. Thus, the diameters and corrugation profiles of the pipes are preferably configured in this manner to assist in shipping.

In a preferred embodiment, the pipe 2 is made of a structurally stable HDPE (high density polyethylene). The corrugated pipe profile is capable of withstanding hydraulic, axial, longitudinal, soil and ring bending loads. The inventive profile maximizes structural integrity and stability while minimizing the material. While a preferred material is HDPE, other types of materials may also be utilized in forming the pipes of the present invention, such as other types of polyethylene or plastics.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A corrugated pipe having a longitudinal axis comprising:
   a plurality of corrugation structures positioned adjacent one another to form a portion of the corrugated pipe, the corrugation structures being centered on the longitudinal axis of the corrugated pipe, each corrugation structure comprising:
   a cylindrical wall centered on the longitudinal axis; and
   an annular U-shaped wall extending from the cylindrical wall, the U-shaped wall comprising:
      two annular straight walls that are spaced from each other and that extend outwardly from the cylindrical wall, each straight wall having a radially outer end; and
      a bowed wall extending axially between the radially outer ends of the two annular straight walls.

2. A corrugated pine having a longitudinal axis comprising:
   a plurality of corrugation structures positioned adjacent one another to form a portion of the corrugated pipe, the corrugation structures being centered on the longitudinal axis of the corrugated pipe, each corrugation structure comprising:
   a cylindrical wall centered on the longitudinal axis; and
   an annular U-shaped wall extending from the cylindrical wall, the U-shaped wall comprising:
   two annular straight walls that are spaced from each other and that extend outwardly from the cylindrical wall, each straight wall having a radially outer end;
   a bowed wall extending axially between the radially outer ends of the two annular straight walls; and
   the U-shaped wall having a thickness that is uniform or substantially uniform throughout the length of the U-shaped wall.

3. A corrugation structure for a corrugated pipe having a longitudinal axis, the corrugation structure comprising:
   an inner cylindrical wall centered on the longitudinal axis;
   two annular wall portions that extend outwardly from the inner cylindrical wall, each of the outwardly extending wall portions having a radially outer end;
   an annular bowed wall portion extending axially between the radially outer ends of the two annular wall portions, the bowed wall portion having an inner surface and an outer surface, with the two annular wall portions and the annular bowed wall portion together defining an outer wall that is connected to the inner cylindrical wall; and
   a centroid defined by the corrugation structure,
   wherein at least a portion of the inner surface of the bowed wall portion has a radius centered on the centroid, and at least a portion of the outer surface of the bowed wall portion has a radius centered on the centroid.

4. The corrugation structure of claim 3, wherein the corrugation structure comprises a plurality of corrugation structures that are positioned adjacent one other and are centered on the longitudinal axis of the corrugated pipe, with each corrugation structure being symmetric about a plane that is perpendicular to the longitudinal axis.

5. A corrugation structure for a corrugated pipe having a longitudinal axis, the corrugation structure being symmetric about a plane that is perpendicular to the longitudinal axis of the corrugated pipe, the corrugation structure comprising:
   an inner cylindrical wall centered on the longitudinal axis of the corrugated pipe, the cylindrical wall having a wall thickness at the plane of symmetry;
   two annular wall portions that extend outwardly from the cylindrical wall and are spaced from one another, each two annular wall portions having a radially outer end;
   a bowed annular wall portion extending axially between the radially outer ends of the two annular wall portions; and
   a cavity bounded by the inner cylindrical wall, the two annular wall portions and the bowed wall portion, the cavity having an inner surface, wherein the inner surface has at least one inner radius and the inner radius is equal to or greater than one half the wall thickness of the inner cylindrical wall at the plane of symmetry.

6. The corrugation structure of claim 5, wherein the corrugation structure comprises a plurality of corrugation structures that are positioned adjacent one another and are centered on the longitudinal axis of the corrugated pipe.

7. A corrugation structure for a corrugated pipe having a longitudinal axis, the corrugation structure being symmetric about a plane that is perpendicular to the longitudinal axis of the corrugated pipe, the corrugation structure comprising:
   an inner cylindrical wall centered on the longitudinal axis of the corrugated pipe;
   two annular wall portions that extend outwardly from the cylindrical wall and are spaced from one another, each annular wall portion having a radially outer end and an outer surface, with each outer surface having an outer surface end point at the radially outer end thereof;
   a curved annular wall portion extending axially between the radially outer ends of the two annular wall portions, the curved wall portion having an outer surface; and
   a peak point located on the outer surface of the curved annular wall portion at the radially outermost point thereof relative to the longitudinal axis, wherein an angle formed between a line extending from the peak point to the outer surface end point of the annular wall portions relative to the longitudinal axis is a function of a predetermined natural slip angle of soil.

8. The corrugation structure of claim 7, wherein the corrugation structure comprises a plurality of corrugation structures that are positioned adjacent one other and are centered on the longitudinal axis of the corrugated pipe.

9. A corrugated pipe having a longitudinal axis comprising:
   first and second corrugation structures positioned adjacent a plurality of corrugation structures to form a portion of the corrugated pipe, the first and second corrugation structures being positioned adjacent one another and centered on the longitudinal axis of the corrugation structure, each of the first and second corrugation structures being symmetrical about a plane that is perpendicular to the axis, each of the first and second corrugation structures comprising:
   a cylindrical wall centered on the axis;
   two annular wall portions extending outwardly from the cylindrical wall at spaced locations relative to one another, the annular wall portions having outer ends and outer surfaces; and
   an annular curved wall portion extending axially between the outer ends of the two annular wall portions, the annular curved wall portion having an outer surface;
   first and second centroids of the first and second corrugations;

a centroid line extending between the first and second centroids; and first and second points of intersection of the centroid line with the outer surfaces of the annular wall portions of the first and second corrugation structures;

wherein a first line extends from the first point of intersection toward the second corrugation structure and is tangent to the outer surface of the annular curved wall portion of the second corrugation structure, and the first line is at a first angle relative to the longitudinal axis that is equal to or greater than a predetermined natural slip angle; and a second line extends from the second point of intersection toward the first corrugation structure and is tangent to the outer surface of the annular curved wall portion of the first corrugation structure, and the second line is at a second angle relative to the longitudinal axis that is equal to or greater than the predetermined natural slip angle.

* * * * *

UNITED STATES PATENT AND TRADEMARK OFFICE
CERTIFICATE OF CORRECTION

PATENT NO. : 6,840,285 B2
DATED : January 11, 2005
INVENTOR(S) : Toliver et al.

It is certified that error appears in the above-identified patent and that said Letters Patent is hereby corrected as shown below:

Column 7,
Line 21, delete "pine" and insert -- pipe --.

Column 8,
Line 44, delete "other" and insert -- another --.

Signed and Sealed this

Tenth Day of May, 2005

JON W. DUDAS
*Director of the United States Patent and Trademark Office*